United States Patent

Henderson

[15] 3,688,261

[45] Aug. 29, 1972

[54] LOGIC PROCESSING SYSTEM

[72] Inventor: John Franklin Henderson, Kearny, N.J.

[73] Assignee: Litton Business Systems, Inc., New York, N.Y.

[22] Filed: Oct. 5, 1970

[21] Appl. No.: 77,892

[52] U.S. Cl. .......................................340/146.1 AB

[51] Int. Cl. ..........................................G08c 25/00

[58] Field of Search ........340/146.1, 172.5; 178/23.1

[56] References Cited

UNITED STATES PATENTS

| | | | |
|---|---|---|---|
| 3,470,532 | 9/1969 | Martens et al. | 340/146.1 |
| 3,160,852 | 12/1964 | Simms, Jr. | 340/146.1 |
| 2,231,397 | 2/1941 | Spencer | 340/146.1 X |
| 3,535,681 | 10/1970 | Coley et al. | 340/146.1 |

*Primary Examiner*—Charles E. Atkinson

*Attorney*—Norman Friedman, Stephen Feldman, Arthur T. Groeninger, Morris I. Pollack and Philip Furgang

[57] ABSTRACT

A logic processing system as disclosed comprising a character checking device which indicates whether the incoming parallel binary coded character has a predetermined number of binary 1s. If the predetermined number of ones is received a plurality of gates passes the signal on to a receiving device. If, on the other hand, the character received does not possess the predetermined number of binary 1s, the character checking device provides a signal under control of a clock to said gates for replacing the "bad" character with a predetermined bad — character — code and, in addition, at the end of a word comprising a plurality of such characters inserts, through end of word logic, an end of word character through a first of the plurality of gates. The code signifies whether the word passed through the receiving device possess all good characters or one or more bad characters.

18 Claims, 6 Drawing Figures

INVENTOR
JOHN F. HENDERSON
BY Philip Furgang
ATTORNEY

INVENTOR
JOHN F. HENDERSON
BY Philip Furgang
ATTORNEY

INVENTOR
JOHN F. HENDERSON
BY Philip Furgang
ATTORNEY

INVENTOR
JOHN F. HENDERSON
BY Philip Furgang
ATTORNEY

INVENTOR
JOHN F. HENDERSON
BY Philip Furgang
ATTORNEY

LOGIC PROCESSING SYSTEM

BACKGROUND OF THE INVENTION

The invention relates to logic processing system and more particularly a system designed to insert a predetermined binary character in place of a character not having a predetermined number of states of an entire word being processed.

Although it is well known to provide a character at the end of a word indicating that one of the characters therein is a bad character (see U.S. Pat. No. 3,025,498 Blodgett), the insertion of a character within a binary word is not believed to have been disclosed before.

SUMMARY OF THE INVENTION

A logic system for evaluating and transmitting the characters of a binary word as provided. This system comprises gating means for gating through the characters of binary words and checking means for controlling said gating means. Said gating means prevents the transmission of any characters not having a predetermined number of binary states and substituting therefore, a predetermined character.

Figure 1:
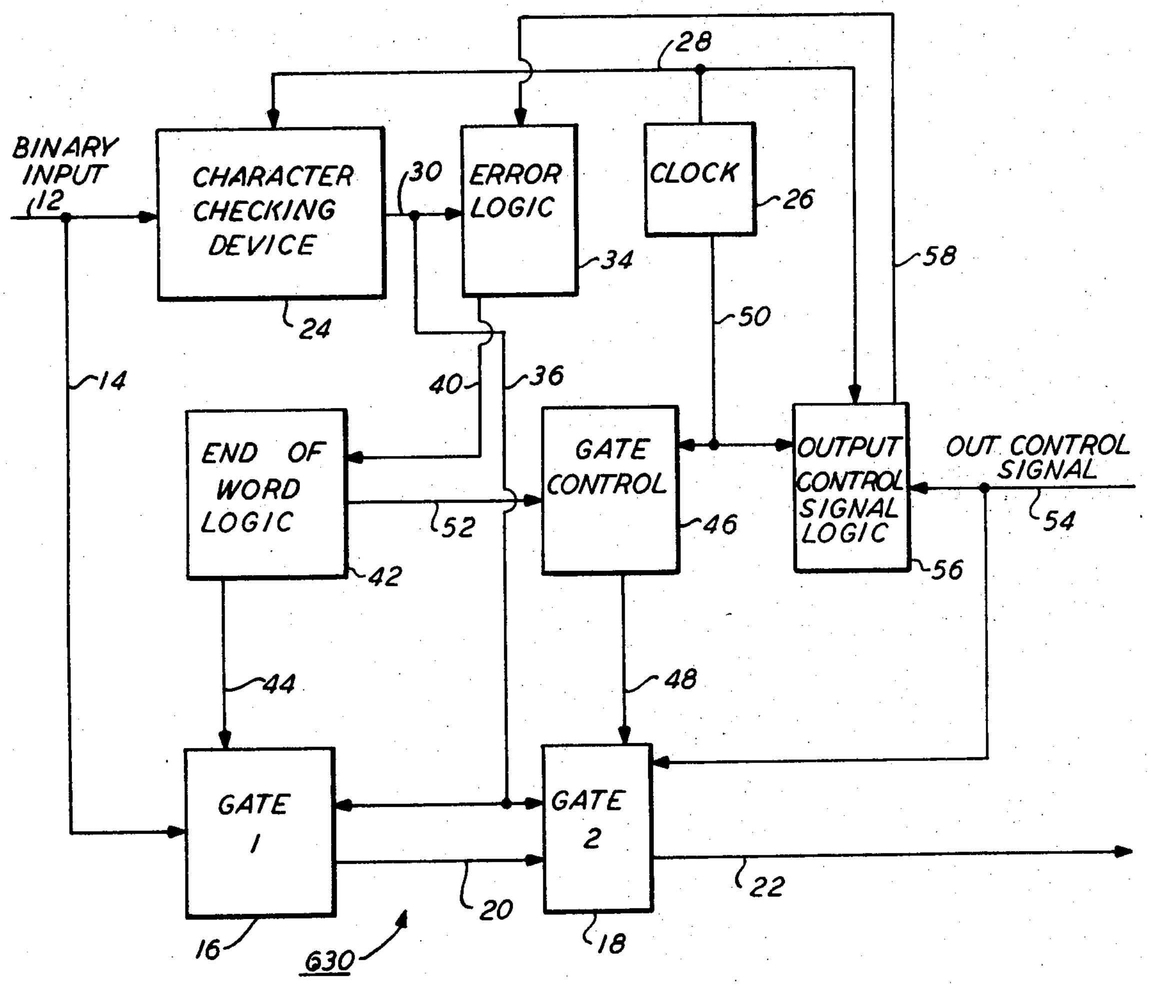
FIG. 1 is a system drawing disclosing the system of this invention.

In accordance with the invention there is provided a logic processing system 630 (FIG. 1) for transmitting binary coded words serially by character and parallel by bit from a first device to a second. The system 630 may be more fully understood by making reference to the drawing and, in particular, FIG. 1 which discloses the logical flow of signals. Binary coded words provided by the first device (not shown), are directed along lines 12 and 14 to first gates 16. From there the words flow through second gates 18, via line 20, and to a second device (not shown) via line 22.

Characters provided to the first gates 16 are also entered into a character checking device 24. The character checking device 24, is controlled, in part, by a clock 26. If a character of a word is provided which does not have predetermined number of binary states the character checking device 24, in conjunction with a clocking signal provided by the clock 26, along clock line 28, provides an error signal on line 30 to error logic 34. The character checking logic 24 also provide an error signal to gates one and two, 16 and 18 respectively, along line 36 causing the system 630 to provide a predetermined bad character code to the second device along line 22. The error logic 34 also provides means, discussed below, for providing various indications and lock-up features indicative of an error condition.

The error logic 34 also provides a signal along line 40 to end of word logic 42. The end of word logic 42 causes, via line 44, gates one and two, 16 and 18, to provide a character to be provided to the second device indicating whether or not the word just entered was error free or not.

A gate control device 46 controls, via line 48, the operation of the gates 16 or 18. Thus, in conjunction with clocking signals from clock 26 (provided via line 50) the gate control device 46 will inhibit or permit the output of characters to the second device. At the end of a word a signal is provided by the end of word logic 42, via line 52, to the gate control device 46 so that gates 16 and 18 will be operated to provide the aforementioned character indicating whether or not the word was error free.

The second device may, for example, require a period of time to receive each character. In this instance, the second device may provide a signal to the system 630 to inhibit the supply of characters. As shown in FIG. 1 a control signal is provided along line 54 to gates 16 and 18 and to an output control signal logic device 56. This logic device 56 provides a signal on line 58 to error logic 34 when the second device provides a signal indicating it is ready to receive more characters and at the same time the clock 26 fails to provide a proper signal via line 50 to the gate control 46 and the output control signal logic 56.

Thus, broadly, the system 630 replaces an unacceptable character with a predetermined character and provides end of word characters which indicates whether or not the word had all acceptable characters.

Figure 2:
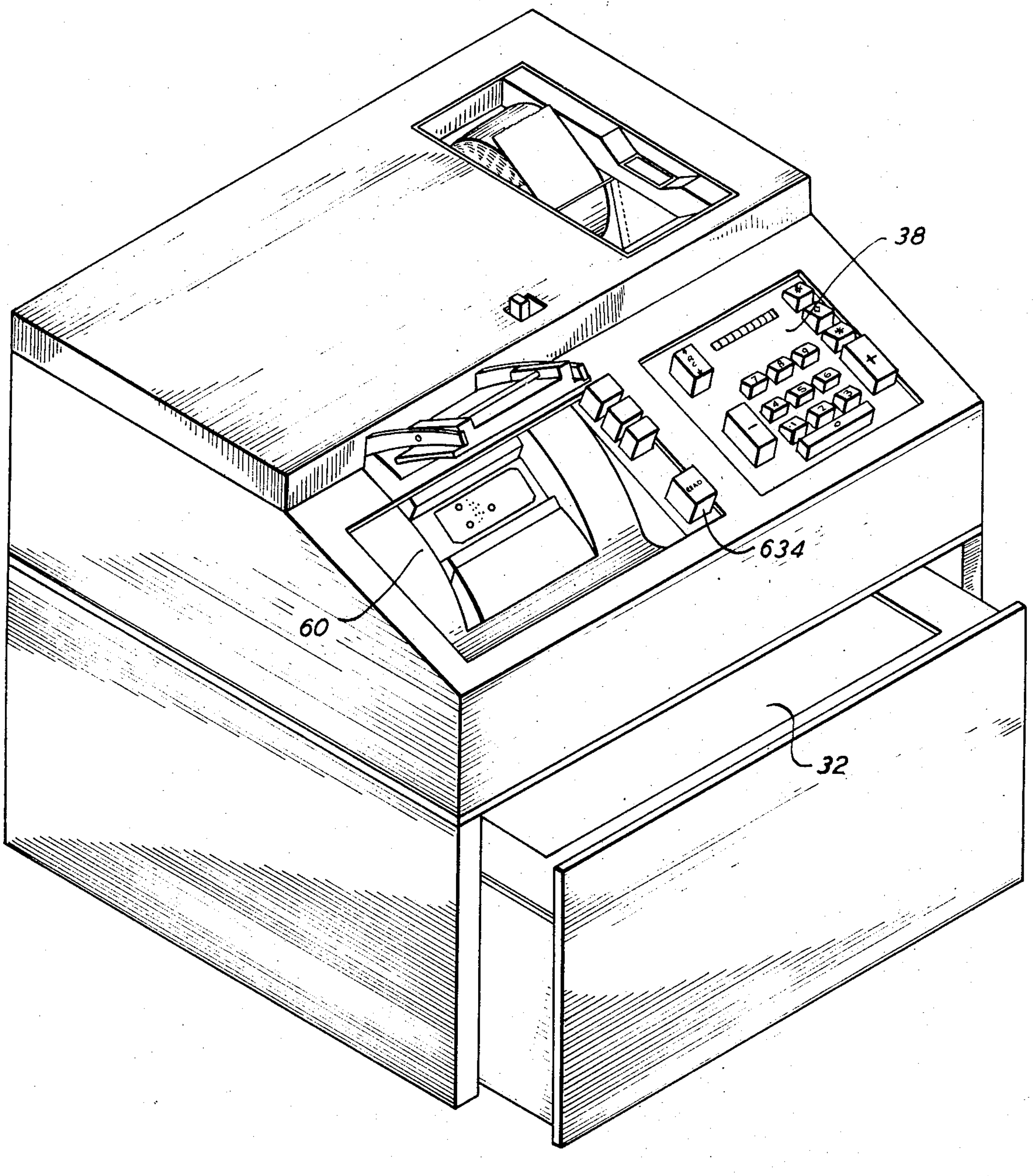
FIG. 2 is a perspective view of a device constructed to employ the invention of this disclosure.

The system 630 and the operation thereof may be more fully understood when considered with the co-pending application, Ser. No. 848,271 entitled Information Gathering System by John Henderson. That system includes (see FIG. 2) a tag or ticket reader 60 (as the first device), which provides the binary coded words to the logic system 630 of this invention, and a keyboard 38 for entering characters manually to the second device - a tape recorder 32.

Figure 3:
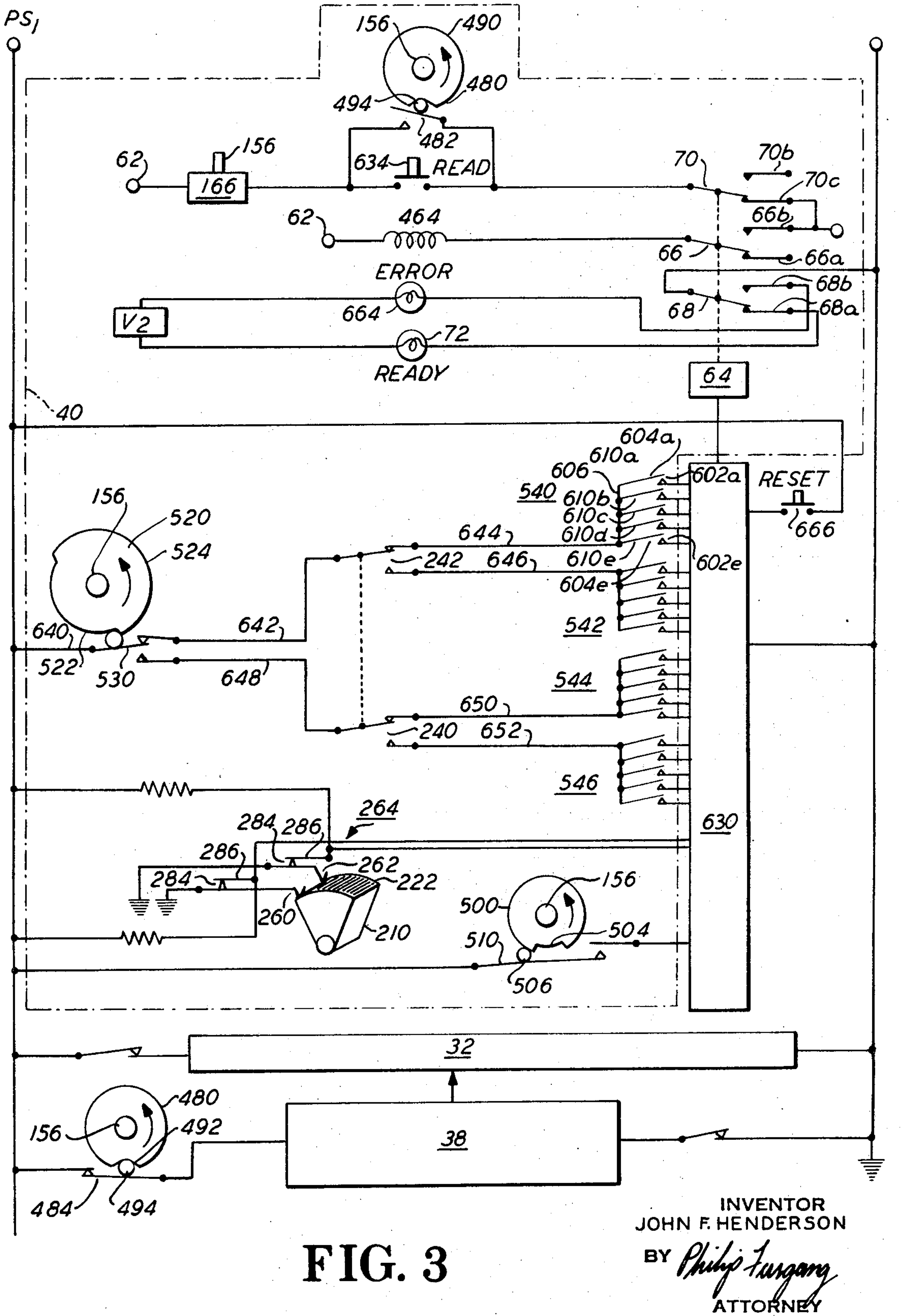
FIG. 3 is a schematic representation of the inter-relation of the system of this invention and the device of FIG. 2.

The inter-relationship of these elements can be more fully understood by making reference to FIG. 3 of this drawing and to the aforementioned co-pending application.

Referring now to FIG. 3, it will be assumed that the appropriate D.C. power supplied through PS1 ground and sources V2 to provide the required power to a tape recorder 32 (i.e. second device) keyboard unit 38 and a reader 60 (i.e. first device) of punched tags of the type disclosed by A.J. Marsh in issued U.S. Pat. No. 2,692,083 as well as the required logic system 630.

The logic system 630 receives the information from sensing unit sets 540 (as will be hereinafter described) and transmits the same to the tape recorder 32, performing thereon various checks to determine that the information is proper and providing output signals such as error signals in a manner and for the purpose as has hereinbefore and to be hereinafter described.

The circuitry of a motor drive unit 166 is open through the normally open contacts of motor microswitch 482 when a follower roller 494 thereof is disposed in a notch 492 of a motor switch cam 480. The motor drive unit 166 is connected at one side to a source of AC voltage 62. The other side of the motor drive unit 166 is connected, via parallel switch of 634 and 482 (the functions of which are more fully explained below), through contacts of a relay 64 to the other side of the source of AC voltage 62. A READ switch 634 (FIGS. 3 and 4), which acts as a shunt around motor microswitch 482, is also in a normally open condition and therefore motor drive unit 166 remains inactive. Keyboard unit 38 is operative with a contact of an interlock microswitch 484 normally closed as follower roller 494 seats in a notch 492 of cam 480. Appropriate magnetizable tape (not shown) should be properly disposed in tape recorder 32. Tape recorder 32 should otherwise be ready to receive information from either keyboard 38 or tag reader 60 through the logic system 630.

A tag (not shown) of the type described is placed in the tag or record reader 60. READ switch 634 is then depressed causing AC voltage from the source of AC voltage 62 to be placed across motor drive unit 166. A power drive shaft 156 of the motor drive unit 166 starts to rotate and follower roller 494 of motor switch 482 moves out of notch 492 and on to motor cam 480. This will close the switch 482 and hole in the circuit of motor drive unit 166. When the READ switch 634 is thereafter released the power to the motor drive unit 166 is continuous. As motor and interlock cam 480 rotate the follower roller 494 of interlock 484 moves out of the notch 492 and on to the cam surface 490, opening the circuit to keyboard unit 38 to prevent any input to the tape recorder 32 from the keyboard unit 38 while the record or tag reader 60 is in operation.

The sensing unit 540 is a schematic representation of star wheel readers, more fully disclosed in the co-pending application. The star wheels pass over holes in a tag placed in the reader 60. The motion of the star wheels move contacts 602 *a, b, c, d*, and *e* away from contacts 604 *a, b, c, d*, and *e* of spring fingers 610 *a, b, c, d*, and *e* of common contact 606.

With the closure of contact 602 and 604 there is a flow of current through a line 640, contacts of a switch 530, a line 642, contacts of a switch 292, a line 644 and those contacts 604 engaged with contacts 602. Concurrently with this operation mechanical contacts or noses 260 and 262 of a commutator switch 264 (which are more fully described in the co-pending application) coact with pins 222 of a commutator cap 210 to open contacts 284 and 286 in a stroke-like fashion to provide clocking pulses to the logic system 630. In the example of this disclosure, only the sensing sets 540 are operative at this time. Sensing sets 542, 544, and 546 remain inoperative due to the position of switches 240 and 242. Switches 240 and 242 are controlled by cam rollers (more fully disclosed in the co-pending application). Mid way through the movement of the commutator cap 210, switch 242 is operated so that the sensing set 542 becomes operative and sensing set 540 becomes inoperative. At a later time sensing sets 544 and 546 comes into operation. The sensing of the perforations in a tag continue until the yoke assumes a mid-cycle position, as described in the co-pending application. At that time the direction of movement thereof is reversed. Concurrently with the reversal of direction of movement of that yoke, the cam surface 524 of cam 520 moves the contact arm switch of 530 into engagement with a line 648, rendering sensing sets 542 inoperative and sensing sets 544 operative through line 640, switch 530, line 648, switch 240, and line 650. Sensing sets 540, 542, and 546 are not inoperative.

At the end of a cycle the yoke moves toward its home position, the follower roller 506 of switch 510 moves into a notch 504 of cam 500 sending a pulse of current to the logic 630. The logic system 630 in turn forward information to the tape recorder 32 to indicate that the tag has been read. Subsequent rotation of the cam 500 moves the follower 506 out of the notch 504 terminating the pulse.

This describes the overall operation of the end of tag switch 510. The roller cam 480 now moves into a position wherein the follower roller 494 drops into the notch 492, thereupon opening the circuit to motor drive unit 166 to terminate the cycle of operation thereof. The follower roller 494 of microswitch 484 has also moved into notch 492 of cam 480 again closing the circuits to keyboard 38. The tag is ejected from the record reader 60 in accordance with the co-pending application, indicating that the information has been properly read. The items of information can now be entered into the tape recorder 32 through the keyboard 38 or through the record reader 60. If, during the reading of a tag there is an incorrect character the logic unit 630 replaces that code with a predetermined character. If, after the entire tag has been read, the logic system 630 determines the information is in error (i.e. that an incorrect character has been read) there will be an output from the logic system 630 to the tape recorder 32.

The logic 630 also provides an error signal that will energize the relay 64. The relay 64 then pulls three single throws 66, 68, and 70 from a first to second pole positions. In the deactive state of relay 64 an open circuit is formed by the source of AC voltage 62 an ejector solenoid 464, a first throw 66 and an open pole 66a. An error light 664 is connected at one end to the voltage source V2 and at the other end to a pole 68b. The throw 68 is connected to ground and, in the inactive state of relay 64 contacts pole 68 completing a circuit including voltage source V2 and READY light 72. As previously recited a circuit is formed of AC voltage source V2, motor drive circuit 166, switches 634 and 482 in parallel, throw 70, pole 70 a and AC voltage source 62.

Upon activation of logic 630 in an error condition, throw 66 contacts pole 66b placing the ejector solenoid 464 across the source of AC voltage 62. This energization of ejector solenoid 464 prevents the ejection of a tag from the reader 60. The operation of the solenoid 464 is more fully disclosed in the co-pending application.

Throw 68 moves from pole 68 to 68 b extinguishing READY light 72 and placing ERROR light 664 in the circuit. At the same time throw 70 moves from pole 70 a to 70 b opening the circuit to the motor drive 166. The reader 60 is now inactivated until reset switch 666 resets the circuitry thus deactivating the relay 64.

The operation of ERROR light 664 and the fact that the tag remains within the tag reader 60 at the end of the cycle is an indication to the operator that the information information has been properly received by the logic system 630 and that such information should be entered into the tape recorder 32 through the keyboard 38. This overview gives the inter-relationship between the mechanical star wheel reader and the tape recorder 32.

Figure 4A:
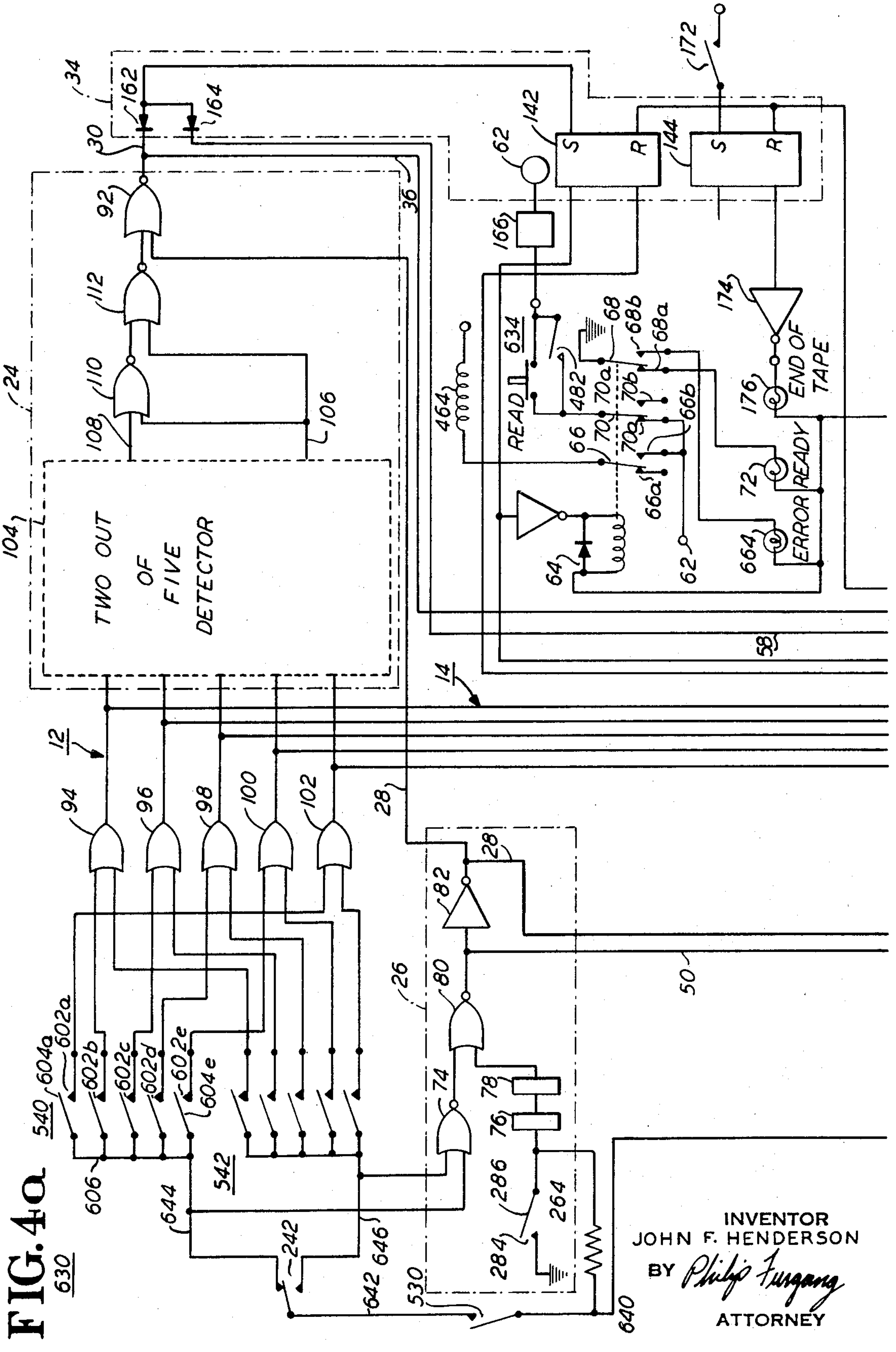
FIGS. 4*a* and *b* are a schematic representation of a system of this invention.
Figure 4B:
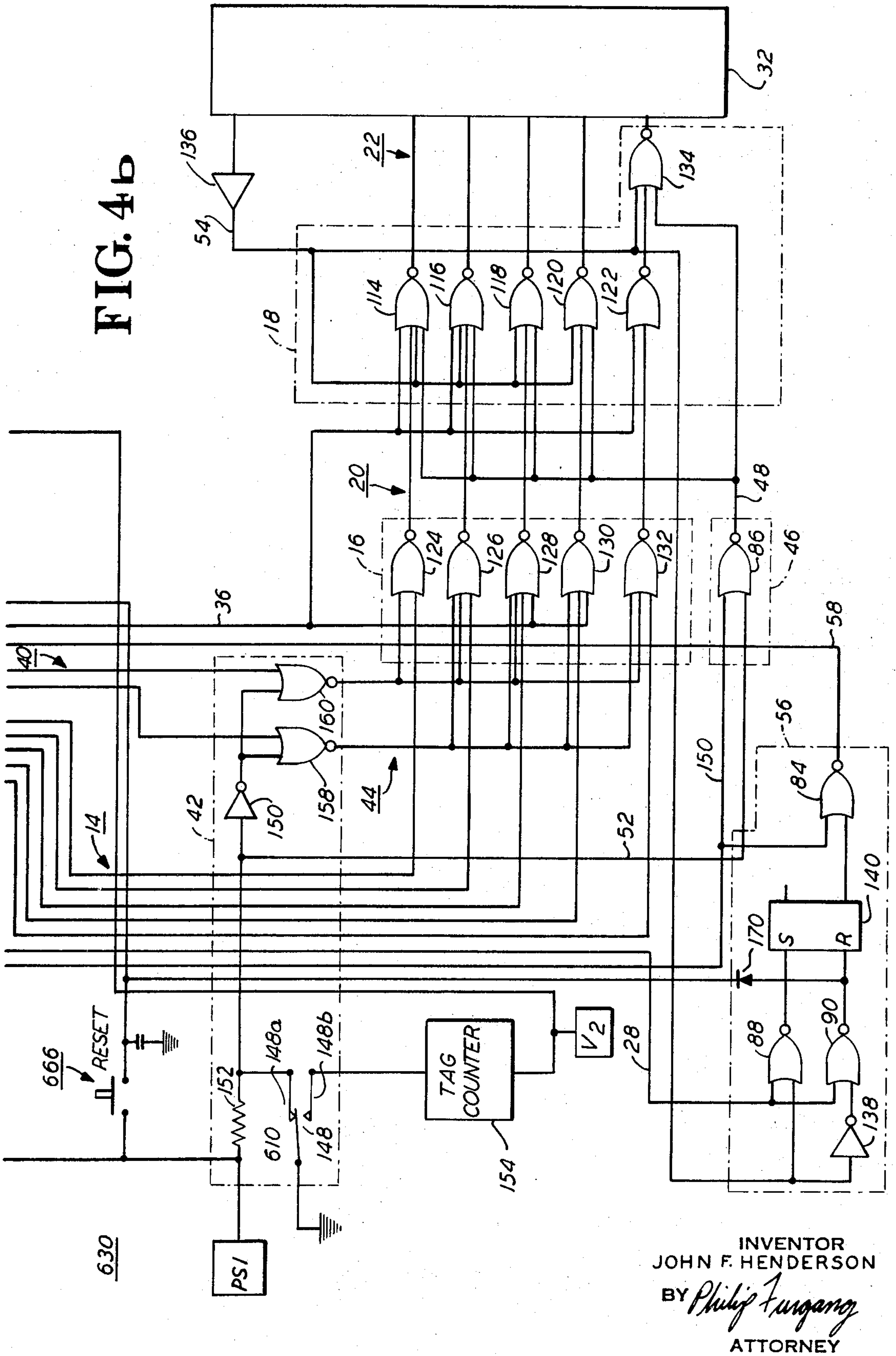

The logic system 630 of this invention may be more fully understood by reference to FIGS. 4a and b which disclose, in detail, the system of FIG. 1. The system blocks of FIG. 1 are set forth in FIGS. 4*a* and b to enclose related system functions and bear reference numerals.

Binary coded words are read, character by character, by the star wheel readers. In the example set forth, switch 530 is closed and voltage is placed across lines 640 and 642 through switch 242 and line 644 across sensing set 540. At this time sensing set 542 is inactive due to the opening of switch 242.

READ switch 634 has been depressed an motor drive unit 166 is energized and causes a rotation of power drive shaft 156 through motor drive unit 166. At this point switch 242 is closed connecting conductor 644 with conductor 642. Thus, the first sensing sets 540 of the star wheel reader is energized. The star wheels now "read" the first set of perforations in the tag. It is to be understood that the selection of a tag reader 60 or some other device is purely arbitrary as is the use of a tape recorder 32 herein. Lines 644 and 646 are coupled to a NOR gate 74. Binary 1 and 0 (binary 1 is interpretated in this example as being the presence of voltage and 0 as ground), appears at the input terminal of NOR gate 74. This provides a binary 0 at the output terminal thereof. At this time the commutator switch 264 is closed, applying a binary 0 to the input terminal of a one-shot multivibrator 76 resulting in a binary 1 at the output of a second one-shot multivibrator 78 and at the input terminal of a NOR gate 80. The 0 and the 1 at the input terminals of NOR gate 80 results in a binary 0 at its output terminal being coupled to the input terminal of an inventer amplifier 82. Thus, the clock 26 produces a 0 on line 50 to the output control signal logic device 56 and the gate control device 46. In particular the binary 0 is applied to the input terminal of NOR gate 84 and 86. The output of the inventer amplifier 82 of the clock 26 provides at this time a binary 1 on line 28 to the character checking device 24 and the output control signal logic 56. In particular, inventer amplifier 82 provides a binary 1 or NOR gate 88 and 90 respectively. The clock binary 1 is applied to one of the input terminals of NOR gate 92.

Assume now that the star wheel readers have not read a character of the perforations in a tag. Note that the output terminals of sensing sets 540 and 542 are coupled to all OR gates 94, 96, 98, 100, and 102. The OR gates 94, 96, 98, 100, and 102 serve to separate the individual contacts of the two sensing sets 540 and 542. The output terminals of the OR gates 94, 96, 98, 100, and 102 are coupled by a line 12 to the character checking device 24 and, via lines 12 and 14 to the first gate 16. In particular, the output of all of the OR gates 94, 96, 98, 100 and 102 are binary 0 coupled to a two-out-of-five detector 104 in the character checking device 24. The two-out-of-five detector 104 is a commonly known device for providing predetermined signals indicative of the number of binary 1s read by the reader 60. One such device is disclosed by Burns in U.S. Pat. No. 3,331,052. The two-out-of-five detector 104 provides a binary 1 on two output lines 106 and 108, respectively, when there are less than two binary 1s on lines 12, a binary 0 and 1 on lines 106 and 108, respectively, when lines 12 have two binary 1s, and two binary 0s on lines 106 and 108 when more than two binary 1s are on line 12.

It therefore follows that with all binary 0s on line 12 the two-out-of-five detector 104 provides binary 1s on lines 106 and 108. This will result in a binary 0 at the output of a NOR gate 110. NOR gate 110 is coupled to lines 106 and 108. A binary 0 appears at the output of a NOR gate 112. NOR gate 112 is coupled to the output terminal of NOR gate 110 and the output line 106. As a result a binary 0 appears at the output of a NOR gate 92.

The output signals of NOR gate 92 are thus provided by the character checking device 24. The binary 0 is applied by a line 36 to the first and second gates 16 and 18 respectively. The second gate 18 comprises five NOR gates 114, 116, 118, 120 and 122. These NOR gates 114, 116, 118, 120 and 122 are coupled to the output terminals five NOR gates 124, 126, 128, 130 and 132 respectively of the first gates 16 via lines 20. In addition, to meet this specialized requirement of this preferred embodiment and in no way to be considered limiting upon the invention disclosed herein, second gate 18 has therein a parity reversing NOR gate 134. The NOR gate 134 is coupled to the parity position NOR gate 122 of the second gates 18. In the preferred embodiment the NOR gates 114 – 132 of each of the first and second gates 16 and 18 are arranged in order of the coded characters being processed. In this instance, the code arrangement is 1, 2, 4, 7 P (for parity). The last position is regarded as parity. Thus, to meet the requirements of a particular tape recorder 32 more fully discussed in the co-pending application, the parity reversing NOR gate 134 is employed.

As another requirement of this device the tape recorder 32 provides a signal to the logic system 630, indicating whether or not it is ready to receive a character of a word. The single throw, double pole switch 510 of end of word logic acts as an end of tag switch. The throw 148 is grounded. One pole 148a is coupled to lines 152, the input terminal of an inverter amplifier 150 and one side of resistor 152. The other side of the resistor 152 is coupled to a source of voltage PS1. The second pole 148b is coupled to a tag counter 154. The other side of the tag counter is coupled to a source of voltage V2.

The end of tag switch 146 pole 148*a* is grounded thereby applying a binary 0 to the NOR gate 86 and invertor amplifier 150. The inverter amplifier 150 thereby supplies a binary 1 to two NOR gates 158 and 160 respectively. The output terminals of NOR gates 158 and 160 must therefore be binary 0 which along with the information emanating from the OR gates 94 – 102 are all at 0 placing the first gate 16 NOR gates 124 – 132 all at 0. NOR gates 86 applies a binary 1 to second gates 18, the result being that all of the output lines going into the tape recorder 32 are locked at binary 0 or grounded.

Figure 5:
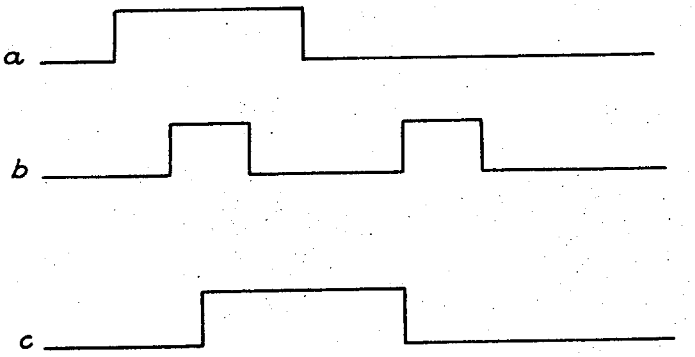
FIG. 5 is a timing diagram representing various signal periods operative in the system description of the preferred embodiment.

Reference should now be made to the timing diagram of FIG. 5 in conjunction with FIGS. 4*a* and *b*. The star wheel readers read the perforations of a tag for a predetermined length of time. In this case the period may be, for example, 25 milliseconds and is indicated by line a of FIG. 5. The commutator is mechanically opened during a period within which the reader is reading a particular character. In this example, approximately 8½ milliseconds later, the commutator switch 264 opens. This opening is caused by the physical relationship between the commutator cap 210 and the mechanical contacts 262 and the perforations on the ticket. The opening of the commutator switch 264 causes the input to the first one-shot multivibrator 76 to go to binary 1 which in turn causes the output of the second one-shot multivibrator 78 to go to binary 0 causing NOR gate 80 to provide a binary 1 via line 50 to NOR gates 84 and 86 as well as to the input terminal of the inverter amplifier 82. This causes inverter amplifier 82 to provide a binary 0 to line 28 and thus to NOR gates 88 and 90, as well as to the input terminal or NOR gate 92.

As a result of this change, NOR gate 88 provides a binary 1. NOR gate 88 is coupled to the set (S) input of flip-flop 140. Flip-flop 140 is thus placed in the set condition. This removes the binary 1 to NOR gate 84 replacing it with a binary 0. The output of NOR gate 84 remains at 0. The output of NOR gate 86, however, goes from binary 1 to binary 0, thus releasing the ground from output of second gates 18. If it is assumed that the tag being read by the sensing sets 540, provides a character having two and only two binary 1s, (a good character) the output of the two-out-of-five detector 104 shall indicate a 0 on line 106 and a 1 on line 108. This will result in a 0 at the output of NOR gate 110 and a 1 at the output of NOR gate 112 which in turn will result in a 0 at the output of NOR gate 92. Therefore, two binary 1s are coupled by a line 14 to the first gate 16. The NOR gates 124 – 132 are arranged in a 1, 2, 4, 7, P code arrangement. It follows that this coded number will be read into the tape recorder 32 from output gate 18 via line 22. However, as previously indicated a parity reversing NOR gate 134 reverse the parity bit, thus providing an extra binary 1 to the tape recorder 32. This is a pecularity of this particular tape recorder 32. It is to be understood that this NOR gate 134 could be easily removed.

Approximately 3 milliseconds later the signal applied by the second gates 18 to the recorder 32 a signal is provided from the recorder 32 to an amplifier 136 indicating that the tape recorder 32 can no longer accept information. Thus, a binary 1 is now supplied to the second gates 18, thus locking the output of second gate 18 at ground and preventing any further information being fed into the tape recorder 32. At the same time the binary 1 is provided to invertor amplifier 128 and NOR gate 88. The output of NOR gate 88 goes to binary 0 and removes the binary 1 from the set(S) input of flip-flop 140. The output of the inverter amplifier 138 becomes binary 0. Thus, a binary 1 placed on the reset input (R) of the flip-flop 140. The output provides a binary 1 to NOR gate 84. In the example of this embodiment the binary 1 signal is provided from the tape recorder 32 for a predetermined period which can be, for example, 28 milliseconds (see line *c* of FIG. 5). After approximately 5 milliseconds the commutator switch 264 closes (see line *b* of FIG. 5) to its binary 0 condition. During the remainder of 28 milliseconds it does not open. If it did, such information provided by the sensing set 540 will not be accepted by the tape recorder 32. Thus, the output of the second one-shot multivibrator 78 goes to binary 1. The output of NOR gate 80 goes to binary 0 and the output of the invertor amplifier 82 goes to binary 1. In this condition a binary 0 is applied via line 50 to NOR gates 84 and 86 and a binary 1 is applied along lines 28 to NOR gates 88 and 90. Two binary 0s applied to NOR gate 86 locks up the output of the second gates 18 into the tape recorder 32 at ground. At the end of the 28 millisecond period (see FIG. 5) output signal along line 54 from the tape recorder 32 returns to binary 0, thus permitting information to be read into the tape recorder. A binary 0 is amplified by the amplifier 136 applied to the second gates 18, the invertor amplifier 138 and NOR gate 88. The tape recorder 32 is now prepared for the next commutator pulse and the next piece of information can be read. At the end of the reading of the tag, the end of tag switch 510 throw 148 ground pole **148*b* closing the counter 154 to be grounded closing a circuit and indicating the passage of one tag. This serves as an indication of the completion of the reading of one word or group of characters. At the same time, inverter amplifier 150 provides a binary 0 to NOR gates 158 and 160 respectively. The output of NOR gate 158 will after all information has been received remain at binary 0. The output of NOR gate 160, however, will go to binary 1. This is because the output of NOR gates 92 and 84 are coupled through blocking diodes 162 and 164 respectively to the set (S) input of flip-flop 142. The set output of flip-flop 142 is coupled to NOR gates 160. The reset output of flip-flop 142 is coupled to NOR gate 158. Thus, in an error free condition the flip-flop 142 is in a reset condition. The reset condition is established by means of closing reset switch 666. Reset switch 666 couples power supply PS1 to the reset (R) input of flip-flops 140, 142, and 144. If flip-flop 142 is not in a rest condition, the pressing of READ switch 634 shall not initiate the operation of reader 60, as has been previously been described. In addition, a binary 1 shall be placed upon NOR gate 86 by the switching of the tag switch 510. The result will be a reading into the tape recorder 32 of the character 11101 in the 1, 2, 4, 7, P code. Thus recorded for later data processing, is an indication that all good information has been sent into the tape recorder 32. At the end of tag (or word) of course, it is to be realized that the output of the OR gates 94 – 102** will all be binary 0.

Let us assume that during the operation of the system 630 that a bad character has been read. In this instance, let us assume that only one position contains a binary 1. During the period when commutator switch 264 is at binary 1 the output of the invertor amplifier 82 is a binary 0. The output of the two-out-of-five detector 104 becomes a binary 1 on lines 108 and a binary 0 on lines 106, providing a binary 0 at the output of NOR gate 110 and a binary 0 at the output of NOR gate 112. This results along with the binary 0 provided by the inverter amplifier 82 in a binary 1 being placed on line 36 and through blocking diode 162 to the set input (S) of flip-flop 142. The binary 1 on line 36 places a binary 1 on selected NOR gates (128, 130, 114, 116, and 122) of gates 16 and 18. The binary 1 provided by NOR gates 92 is passed blocking diode 162 to the set input (S) of flip-flop 142 causing a set output of the flip-flop 142 and causing a binary 1 on set output of the flip-flop 142 instead of a binary 0, thereby placing an 0 on NOR gate 158. The set output of flip-flop 142 now goes to binary 1 placing a binary 0 at NOR gate 160. However, since the output of the inverter amplifier 150 remains at binary 1, the output of both NOR gate 158 and 160, respectively, remains at binary 0. Assuming that the binary 1 is provided by the sensing sets 540 through OR gates 94 along one of line 14 to the code position 1 of the first gate 16 (i.e. NOR gate 124). The output from first gate 16 is 01001 corresponding to 1, 2, 4, 7, P position. As a result thereof, the output of second gates 18 therefore 00110 with the parity reversing NOR gate 134 changing the last mentioned position to a 1. This symbol, of 01111 corresponding to the 1, 2, 4, 7, P position, indicates that a bad code has been read. The same result is achieved in a "bad" character having more than two binary 1s are provided. Clearly any other predetermined character can be arranged by merely changing them or altering the lines to which line 36 is connected to gate 16 and 18. Thus, this system 360 replaces a bad character with a bad character code. Coupled to the set output of flip-flop 142 is an invertor amplifier 168. The relay 64 is coupled to the output of invertor amplifier. A binary 1 at the set output of flip-flop 142 causes relay 64 to be energized. The resulting switch effect has been previously described with reference to FIGS. 2 and 3.

With the commutator switch 264 still open, that is with NOR gate 80 providing a binary 1 to the invertor amplifier 82, the tape recorder 32 provides a signal to the system 630 through amplifier 136 indicative of the fact that shall not receive characters. This places binary 1 on the second gates 18, thus placing the output level at ground and at the same time binary 1 is placed at inverter amplifier 138 and NOR gate 88 causing binary 0 to be placed at the input terminal of NOR gate 90. This causes the NOR gate 90 to provide a binary 0 to the set inputs (S) and a binary 1 to the reset input (R). A blocking diode 170 blocks this 1 from the reset input of the flip-flop 142 and 144. The blocking diode 170 couples the reset (R) of input terminals of flip-flop 140 to reset switch 66. The flip-flop 140 is reset providing a 1 to the NOR gate 84.

Successive characters read from the tag by the sensing set 540 shall be read into the tape recorder 32. At the end, the end of tag switch 510, however, opens providing the recorder 32 with an indication that the tag has been read placing a binary 1 on the input terminals of invertor amplifier 150. This provides a binary 0 to NOR gates 158 with 160 with binary 0s. The binary 0s causes the NOR gates 158 in this instance to provide a binary 1 to the first gate 16 and a binary 0 to be provided by NOR gate 160. The particular connection between NOR gates 158 and 160 and the first gate 16 determines the end of tag code and is arbitrarily selected. This causes the second gates 18 and to supply the tape recorder 32 with the character 01111 corresponding to a predetermined code that a bad character has been read somewhere in the tag field or word. Clearly the code determining bad or good characters is predetermined by the arrangement of gates 158 and 160 inter-connected with the individual NOR gates of NOR gates 124 – 132 of first gate 16. In order to re-read the ticket or to read the next ticket it is imperative that the reset switch 666 be pressed. This causes a binary 1 to be placed at the reset input terminals (R) of flip-flops 140, 142, and 144 which would thereby release the solonoid 464, turn off the ERROR light 664, lighting the ready lamp 72, and permitting the power to be placed in motor circuit 166.

One further requirement is provided because of the peculiar "recording" requirements of the tape recorder 32. Assume that the commutator switch 264 is opened just prior to the termination of the not ready binary 1 provided by the tape recorder 32. In the event that the switch 264 does not open within that period of time, then a binary 1 will appear as a binary 0 at the output of NOR gate 88. The flip-flop 140 will be in a set condition. The flip-flop 140 will provide a 0 to NOR gate 84. If the commutator switch 264 is not operating at that time, a binary 0 will appear at the other input to NOR gate 84 providing binary 1 on line 58, pass blocking diode 164 to the set input(S) of flip-flop 142.

Finally, the tape placed in the tape recorder 32 may be provided with electrical contact such as metal foil, both at the beginning and the end of the tape. This is well known in the art and is used to signify the end or beginning of the tape. In the event that reading begins either prior to the beginning of the tape or the end of the tape, switch 172 will close providing a binary 1 to the set input of flip-flop 144. This will remove the binary 1 from the reset output of flip-flop 144, causing an inverter amplifier 174 coupled thereto to provide a binary 1 to an end of tape lamp 176, thereby lighting the light 176 and indicating that there is an end of tape signal providing the operator with an indication that the tape has been used or reading has begun too early.

What is claimed

1. A logic system for receiving, evaluating, and transmitting characters of binary coded words comprising:

gating means for gating through the characters of binary coded words; and checking means for controlling said gating means and for preventing the gating of any character not having a predetermined number of bits in a particular binary state, a character not having said predetermined number of bits being denominated a "bad" character, a character having said predetermined number of bits being denominated a "good" character;

said checking means including means for generating a first predetermined character indicative of the "-bad" character and for causing said gating means to gate through said first predetermined character as a substitute for the "bad" character.

2. A logic system as recited in claim 1 wherein said checking means includes means for generating a second predetermined character indicating that the word evaluated by said system has therein all "good" characters and also for generating a third predetermined character indicating that the word evaluated by said system as therein any "bad" character, and for causing said gating means to gate through said evaluated word together with said second or third predetermined characters, depending respectively upon whether the word has therein all "good" characters or has therein a "bad" character.

3. A logic system as recited in claim 1 wherein said checking means comprises character checking device means providing signals indicative of whether or not the characters have said predetermined number of bits, said gating means responsive to said signals provided by said character checking device means to provide said first predetermined character instead of a "bad" character.

4. A logic system as recited in claim 3 wherein said character checking device means comprises means for detecting the number of bits in said particular binary state of the character received by said system and logic means for providing a signal indicative of a "good" character (i.e. a "good" character signal) and a signal indicative of a "bad" character (i.e. a "bad" character signal).

5. A logic system as recited in claim 4 wherein the characters are binary coded and serially received bits and said gating means comprises at least two groups of gates, each of said group of gates comprising a plurality of individual gating means, said two groups of gates responding to said "bad" character signals to transmit said first predetermined character upon receipt by said system of a "bad" character.

6. A logic system as recited in claim 5 wherein said checking means includes means for providing a second predetermined character at the end of a binary word indicating whether the word evaluated by said system has therein all "good" characters and a third predetermined character indicating that the word evaluated by said system has any "bad" characters therein.

7. A logic system as recited in claim 5 further comprising clock means for providing clock signals at the time of receipt of a character, said clock being coupled to said character checking device means such that said character checking device means is capable of providing said "bad" signals only upon the presence of said clock signal.

8. A logic system as recited in claim 7 further comprising error logic means for providing an indication of a "bad" character having been received.

9. A logic system as recited in claim 8 wherein said error logic means is coupled to said character checking device means and is responsive to said "bad" signal.

10. A logic system as recited in claim 9 wherein at least one of said individual gating means in said two groups of gates is responsive to said "bad" signal.

11. A logic system as recited in claim 10 wherein said means for detecting the number of binary states of the characters received has two output lines and provides binary 0s on said output lines if a received character has less than two binary 1s, binary 1 and 0 on a first and second respectively of said output lines, if the character received has two binary 1s, and binary 1s on said output lines if the character has more than two binary 1s, said logic means comprising a first gate coupled to said output lines, a second gate coupled to said first NOR gate and said first output line, and a third gate coupled to said second NOR gate and to said clock means.

12. A logic system as recited in claim 11 further comprising gate control means coupled to said gating means and said clock such that said gate control means prevents characters from being transmitted during the period said clock means does not provide said clock signal.

13. A logic system as recited in claim 12 wherein said gate control means comprises at least one gate, said gate control means gate is coupled to said clock and coupled, at its output, to one of said two groups of gates such that said logic system transmits a character only upon receipt by said gate control means of said clock signal.

14. A logic system for receiving, evaluating, and transmitting characters of binary coded words comprising:

- gating means for gating through each character of binary coded words; and
- checking means including means for generating a first predetermined character indicating if the word contains characters each containing a predetermined number of bits of a particular binary state (i.e. a "good" character) and a second predetermined character if the word contains any character not having said predetermined number of bits (i.e. a "bad" character), and for controlling said gating means to gate through said word together with said first predetermined character if the word contains only good characters and for controlling said gating means to gate through said word together with said second predetermined character if the word contains any "bad" character.

15. A logic system as recited in claim 14 wherein said checking means comprises character checking device means for providing a character checking "good" signal indicative of the receipt of a "good" character and a character checking "bad" signal indicative of the receipt of a "bad" character, and, means for determining an error condition coupled to said gating means and responsive to said character checking good and bad signal such that said gating means transmits said first and second predetermined characters upon the end of said word.

16. A logic system as recited in claim 15 wherein said gating means comprises at least two groups of gating means each of said two groups comprising individual gating means with at least one of said individual gating means for each bit location of a character.

17. A logic system as recited in claim 16 wherein said means for determining an error condition comprises:

- error logic means coupled to said character checking device means and providing error logic "good" and "bad" signals and, end of word logic means responsive to said error logic "good" and "bad" signals and coupled to predetermined ones of said individual gating means of one of said two groups of gating means.

18. A logic system as recited in claim 17 wherein said error logic means comprises at least one flip-flop coupled to said character checking device means and said end of word logic means comprises means for providing an end of word signal which indicates the end of a word and at least two gates, said end of word gates being responsive to said means for providing said end of word signal and coupled to said flip-flop such that upon the end of a word said end of word gates provides to said one of said two groups of means said gating signals to cause said gating means to transmit either of said first or second predetermined characters.

* * * * *